(12) United States Patent
Lee et al.

(10) Patent No.: US 12,191,790 B2
(45) Date of Patent: Jan. 7, 2025

(54) POWER MODULE WITH PROTECTION CIRCUIT

(71) Applicant: Infineon Technologies Austria AG, Villach (AT)

(72) Inventors: Minsub Lee, Cheonan-si (KR); Junbae Lee, Seoul (KR)

(73) Assignee: Infineon Technologies Austria AG, Villach (AT)

( * ) Notice: Subject to any disclaimer, the term of this patent is extended or adjusted under 35 U.S.C. 154(b) by 171 days.

(21) Appl. No.: 18/098,368

(22) Filed: Jan. 18, 2023

(65) Prior Publication Data

US 2023/0155532 A1 May 18, 2023

Related U.S. Application Data

(63) Continuation of application No. 17/477,727, filed on Sep. 17, 2021, now Pat. No. 11,601,083.

(51) Int. Cl.
*H02P 27/06* (2006.01)
*H02P 29/024* (2016.01)

(52) U.S. Cl.
CPC ............ *H02P 27/06* (2013.01); *H02P 29/024* (2013.01)

(58) Field of Classification Search
CPC ........ H02P 27/06; H02P 27/08; H02P 29/024; H02P 29/027; H02P 29/0241; H02P 29/028; H02P 27/00; H02P 27/04; H02P 25/00; H02P 25/062; H02P 25/064; H02P 25/107; H02P 21/22; H02P 3/12; H02P 3/22; H02M 7/44; H02M 3/135; H02H 7/1225; H02H 7/085; H02H 7/1227; H01L 29/72; H01L 29/7393; H01L 27/0255; H01L 27/0248
See application file for complete search history.

(56) References Cited

FOREIGN PATENT DOCUMENTS

| CN | 101902182 A | * 12/2010 | ................ H02P 1/30 |
|---|---|---|---|
| CN | 107181420 B | 8/2020 | |
| EP | 3493343 B1 | 3/2021 | |

OTHER PUBLICATIONS

You-sheng Wang, Improved Constant Variable Frequency Variable Voltage Soft Starter, Dec. 1, 2010, Clarivate Analytics, pp. 1-21. (Year: 2010).*

(Continued)

*Primary Examiner* — Antony M Paul
(74) *Attorney, Agent, or Firm* — Murphy, Bilak & Homiller, PLLC (57) ABSTRACT

A power module for driving a motor includes: a positive bus input voltage terminal; a phase terminal for each motor phase; an inverter including a half bridge for each motor phase, each half bridge including a high-side power switch electrically coupled between the positive bus input voltage terminal and respective phase terminal, and a low-side power switch electrically coupled between the respective phase terminal and ground; a first driver circuit for driving a gate terminal of each power switch; a protection switch electrically coupled in series between the positive bus input voltage terminal and each high-side power switch, and having a greater short-circuit withstand time and a lower short-circuit current level compared to each inverter power switch; and a second driver circuit for turning on the protection switch during normal operation and turning off the protection switch in response to a detected short circuit condition.

20 Claims, 9 Drawing Sheets

(56) References Cited

OTHER PUBLICATIONS

"Control integrated power system (CIPOS™)", CIPOS™ Mini IPM technical description; AN2016-10 Application Note, V 2.5, Nov. 11, 2019, 1-46.

* cited by examiner

POWER MODULE WITH PROTECTION CIRCUIT

BACKGROUND

Intelligent Power Modules (IPMs) are highly integrated, compact power modules designed to drive motors in applications ranging from home appliances, fans, and pumps to general purpose drives. IPMs include an inverter having a half bridge for each motor phase. Each half bridge typically includes a high-side IGBT (insulated gate bipolar transistor) electrically coupled between a positive bus input voltage terminal and the respective phase terminal, and a low-side IGBT electrically coupled between the respective phase terminal and ground. The IGBTs included in an IPM must meet specific requirements regarding short circuit withstand time (SCWT) where SCWT is the time interval between the instant when the device drive rises to 50% of its peak value and the instant when it falls to 50% of its peak value. In other words, SCWT is the time an IGBT can withstand short circuiting under specified conditions.

Motors are capable of absorbing very high current levels for relatively long periods (milliseconds to seconds depending on motor size and type). However, IGBTs have short-circuit withstand times in the order of microseconds. The short-circuit withstand time of an IGBT is related to its transconductance or gain and the thermal capacity of the IGBT die. Higher gain leads to higher short-circuit current levels within the IGBT whereas lower gain result in lower short-circuit levels. Higher gain, however, results in lower on-state conduction losses. Accordingly, a trade-off must be made between low on-state losses and short-circuit withstand time. As such, the performance of IGBTs such as Vce(sat) and switching speed is limited.

Thus, there is a need for a power module with robust short-circuit withstand time but without sacrificing IGBT performance.

SUMMARY

According to an embodiment of a power module for driving a motor, the power module comprises: a positive bus input voltage terminal; a phase terminal for each phase of the motor; an inverter comprising a half bridge for each phase of the motor, each half bridge comprising a high-side power switch electrically coupled between the positive bus input voltage terminal and the respective phase terminal and a low-side power switch electrically coupled between the respective phase terminal and ground; a first driver circuit configured to drive a gate terminal of each power switch of the inverter, the first driver circuit including level shift circuitry configured to provide a turn-on gate-to-emitter voltage to each high-side power switch of the inverter; a protection switch electrically coupled in series between the positive bus input voltage terminal and each high-side power switch of the inverter, the protection switch having a greater short-circuit withstand time (SCWT) and a lower short-circuit current level compared to each power switch of the inverter; and a second driver circuit configured to turn on the protection switch during normal operation of the power module and to turn off the protection switch in response to a detected short circuit condition, the second driver circuit including level shift circuitry configured to provide a turn-on gate-to-emitter voltage to the protection switch.

According to an embodiment of a power electronic system, the power electronic system comprises: a multi-phase motor; and a power module configured to drive the multi-phase motor, wherein the power module comprises: a positive bus input voltage terminal; a phase terminal electrically coupled to each phase of the multi-phase motor; an inverter comprising a half bridge for each phase of the multi-phase motor, each half bridge comprising a high-side power switch electrically coupled between the positive bus input voltage terminal and the respective phase terminal and a low-side power switch electrically coupled between the respective phase terminal and ground; a first driver circuit configured to drive a gate terminal of each power switch of the inverter, the first driver circuit including level shift circuitry configured to provide a turn-on gate-to-emitter voltage to each high-side power switch of the inverter; a protection switch electrically coupled in series between the positive bus input voltage terminal and each high-side power switch of the inverter, the protection switch having a greater short-circuit withstand time (SCWT) and a lower short-circuit current level compared to each power switch of the inverter; and a second driver circuit configured to turn on the protection switch during normal operation of the power module and to turn off the protection switch in response to a detected short circuit condition, the second driver circuit including level shift circuitry configured to provide a turn-on gate-to-emitter voltage to the protection switch.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Described herein is a power module for driving a motor and that has robust short-circuit withstand time without sacrificing power switch performance. The power module includes an over-current protection switch having a greater (longer) short-circuit withstand time (SCWT) and a lower short-circuit current level compared to each power switch of the power module inverter. Accordingly, the power switches that form the inverter circuit of the power module may be optimized for better performance by excluding SCWT as a requirement of the inverter power switches. For the same transistor performance, chip (die) size may be reduced to yield cost saving since SCWT is not a constraint. As used herein, the term "power switch" refers to a semiconductor transistor device that is rated to accommodate voltages of at least 100V and more commonly on the order of 400V or higher and/or currents of at least 1A and more commonly on the order of 10A or higher.

Described next, with reference to the figures, are exemplary embodiments of the power module.

Figure 1:
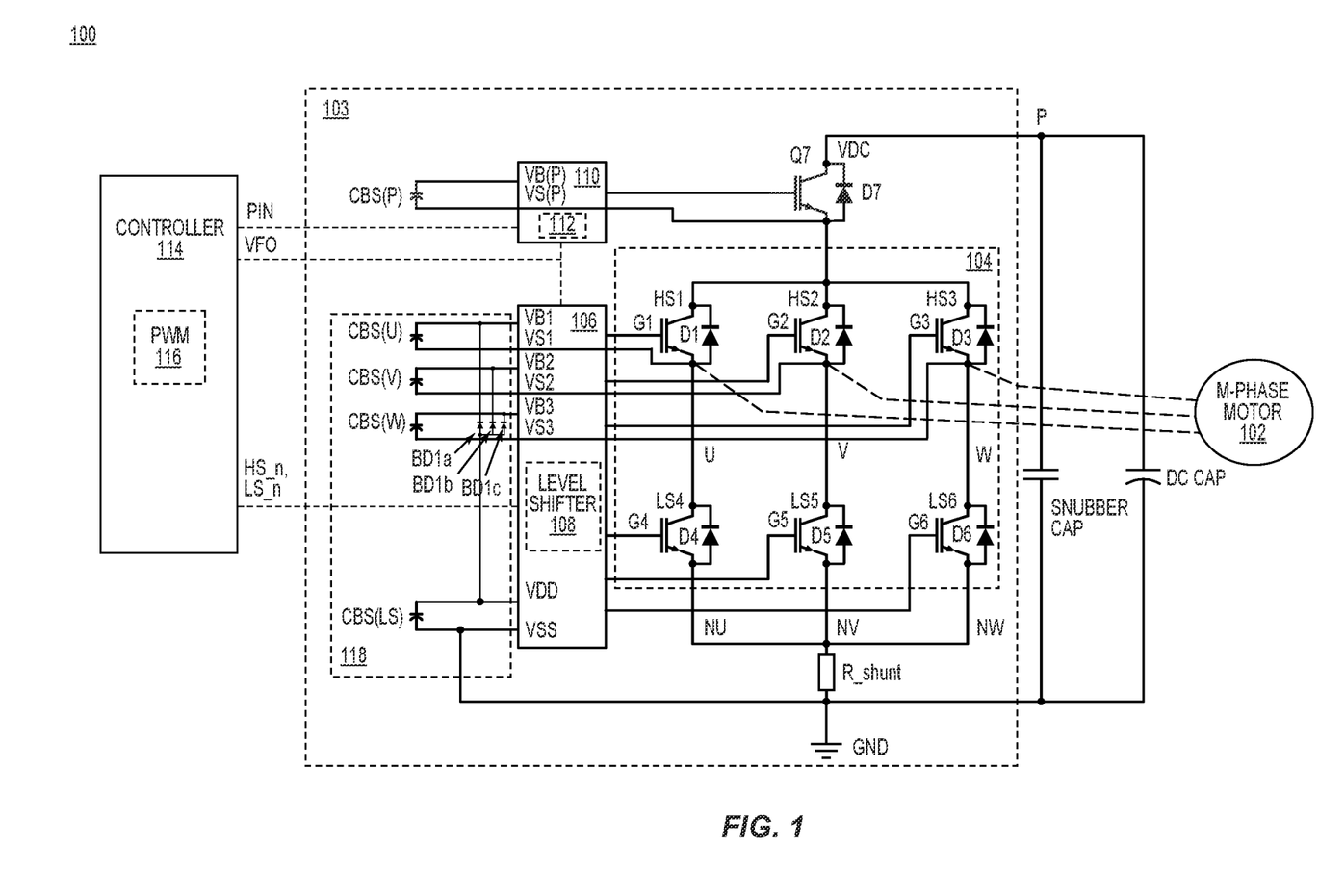
FIG. 1 illustrates a schematic view of an embodiment of an electronic system that includes a multi-phase motor and a power module for driving the multi-phase motor, the power module including an inverter and an over-current protection switch separate from the power switches of the inverter.

FIG. 1 illustrates an embodiment of an electronic system 100 that includes a motor 102 and a power module 103 for driving the motor 102. The power module 103 includes a positive bus input voltage terminal 'P', a phase terminal 'U', 'V', 'W' for each phase of the motor 102, and an inverter 104 which includes a half bridge for each phase of the motor 102. Each half bridge includes a high-side power switch HSn such as an IGBT (insulated gate bipolar transistor), SiC MOSFET (metal-oxide-semiconductor field-effect transistor), etc. electrically coupled between the positive bus input voltage terminal P and the respective phase terminal U/V/W and a low-side power switch LSn such as an IGBT, SiC MOSFET, etc. electrically coupled between the respective phase terminal U/V/W and ground. A freewheeling diode is coupled anti-parallel with each inverter power switch HSn/LSn of the power module 103, to protect the corresponding power switch HSn/LSn by providing a freewheeling path that prevents reverse current. The freewheeling diode may be monolithically integrated with the corresponding power switch HSn/LSn or provided as a discrete component, e.g., depending on the type of power switches used.

The power module 103 also includes a first driver circuit 106 for driving the gate terminal Gn of each power switch HSn/LSn of the inverter 104. The first driver circuit 106 of the power module 103 includes level shift circuitry 108 for providing a turn-on gate-to-emitter voltage to each high-side power switch HSn of the inverter 104.

The power module 103 further includes an over-current protection switch Q7 such as an IGBT, SiC MOSFET, etc. electrically coupled in series between the positive bus input voltage terminal P of the power module 103 and each high-side power switch HSn of the inverter 104, thereby providing a voltage node 'VDC' between the positive bus input voltage terminal P of the power module 103 and the inverter power switches HSn, LSn. A freewheeling diode D7 coupled anti-parallel with the protection switch Q7 provides a freewheeling path that prevents reverse current in the protection switch Q7.

The protection switch Q7 has a greater short-circuit withstand time (SCWT) and a lower short-circuit current level compared to each power switch HSn/LSn of the inverter 104. Accordingly, SCWT is not a constraint when selecting the inverter power switches HSn, LSn. As such, the power switches HSn, LSn included in the inverter 104 of the power module 103 may be optimized for better performance. For the same transistor performance, die size may be reduced for the inverter power switches HSn, LSn to yield cost saving since SCWT is not a constraint. In one embodiment, the protection switch Q7 has the same breakdown voltage rating as each power switch HSn/LSn of the inverter 104. Separately or in combination, the protection switch Q7 may have a lower saturation current and a lower collector-emitter saturation voltage than each power switch HSn, LSn of the inverter 104.

A second driver circuit 110 turns on the protection switch Q7 during normal operation of the power module 103 and turns off the protection switch Q7 in response to a detected short circuit condition. During normal operation, the protection switch Q7 is on (conducting) and each high-side power switch HSn of the inverter 104 is electrically connected to VDC which corresponds to the voltage provided by the positive bus input voltage terminal P of the power module 103. During normal operation, the protection switch Q7 is always on and therefore fast switching is not required. Hence, the protection switch Q7 may have a lower collector-to-emitter saturation voltage relative to the power switches HSn, LSn of the inverter 104.

The half bridges of the inverter 104 are switched to implement normal motor drive operation. If a short circuit condition is detected during inverter operation, the second driver circuit 110 turns off the protection switch Q7 and the protection IGBT Q7 enters a blocking state. When the protection switch Q7 is in the blocking state, the half bridges of the inverter 104 are electrically disconnected from VDC by the protection switch Q7. The second driver circuit 110 includes level shift circuitry 112 for providing a turn-on gate-to-emitter voltage to the protection switch Q7, for controlling the state of the protection switch Q7.

A controller 114 is provided for controlling both the first driver circuit 106 and the second driver circuit 110 of the power module 103. For example, the controller 114 may include a PWM (pulse with modulator) 116 for controlling the switching state of the inverter power switches HSn, LSn. The controller 114 may be included in the power module 103 or may be a component that is separate from the power module. The first driver circuit 106 and the second driver circuit 110 may share a fault signal output 'VFO' provided to the controller 114 for indicating whether a fault has occurred. The power module 103 may also include a shunt resistor R_shunt for sensing the inverter current. A snubber capacitor 'Snubber Cap' protects the power switches HSn, LSn from overvoltage, and a DC capacitor DC Cap' reduces dc bus voltage and current ripple.

In FIG. 1, 'VB(P)' and 'VS(P)' represent the power supply for the protection switch Q7 whereas 'VBn' and 'VSn' represent the power supply for the respective high-side power switches HSn of the inverter 104. 'VDD' and 'VSS' represent the power supply for the low-side power switches LSn of the inverter 104. The emitter potential VS(P) of the protection switch Q7 is floating and is handled differently than the emitter potential VSn, VSS for the inverter power switches HSn, LSn. For example, when low-side power switch LS1 for phase U turns on, capacitor CBS(U) is charged through a first bootstrap circuit 118. The high-side power switch HS1 for phase U then turns on, and capacitor CBS(P) can be charged through a second bootstrap circuit or by an isolated power source (not shown in FIG. 1). Capacitor CBS(P) provides power to the second driver circuit 110 and provides proper gate-emitter potential biasing for the protection switch Q7 which enables the second driver circuit 110 to properly drive the protection switch Q7. Embodiments for charging capacitor CBS(P) are described later herein in more detail.

Figure 2:
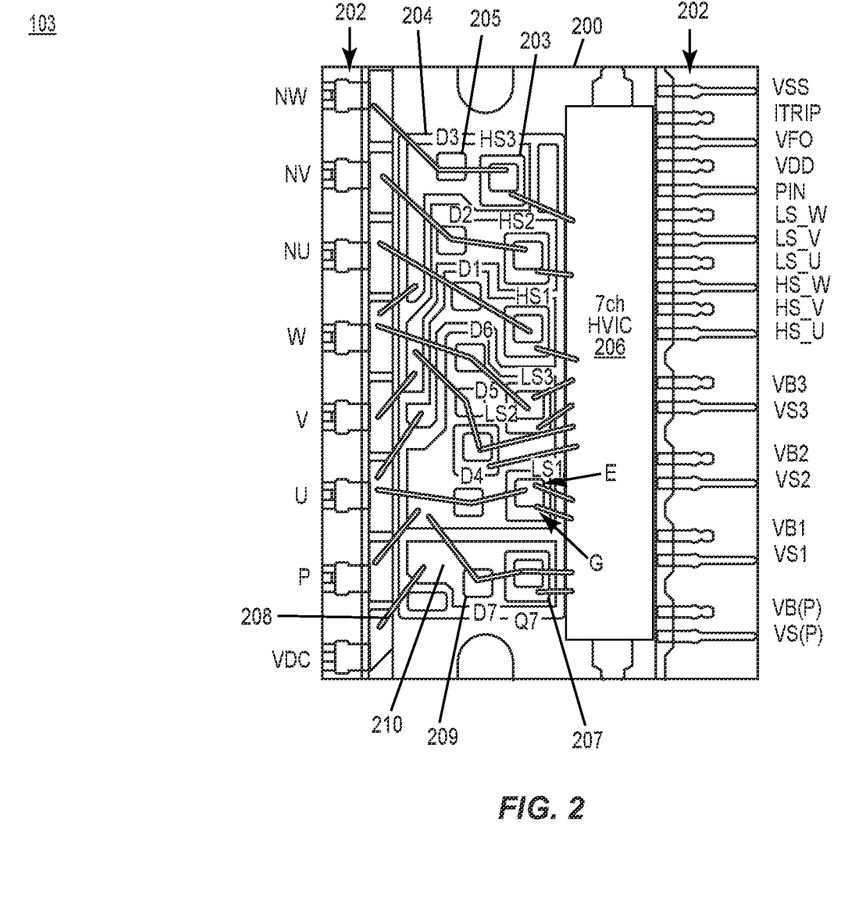
FIG. 2 illustrates a plan view of an embodiment of the power module in a package, according to an embodiment.

FIG. 2 illustrates an embodiment of the power module 103 in a package 200. The package 200 includes terminals 202 for the various signals and power connections previously described herein. This includes terminals for the motor phases U/NU, V/NV, W/NW, terminals for supplying power VDD/VSS, VB1/VS1, VB2/VS2, VB3/VS3 to the first driver circuit 106, terminals for supplying power VB(P)/VS (P) to the second driver circuit 110, terminals for receiving control signals HS_U, LS_U, HS_V, LS_V, HS_W, LS_W from the controller 114 for controlling the switching state of the inverter power switches HSn, LSn, a terminal for receiving a control signal PIN from the controller 114 for controlling the switching state of the protection switch Q7 during normal operation, and terminals for transmitting to the controller 114 the fault signal output VFO and a signal 'ITRIP' that indicates an abnormal current detected via the current sensing provided by the shunt resistor R_shunt. The dies 203 for the inverter power switches HSn, LSn and the dies 205 for the corresponding diodes D4 and the die 207 for the protection switch Q7 and the die 209 for the corresponding diode D7 are attached to one or more substrates 204 included in the package 200.

According to the embodiment illustrated in FIG. 1, the first driver circuit 1036 and the second driver circuit 110 are integrated in the same semiconductor die 206. The single driver semiconductor die 206 is a high-voltage integrated circuit ('HVIC') since the die 206 drives both high-side and low-side power switches HSn, LSn and the protection switch Q7 which has a floating emitter potential. The single driver semiconductor die 206 has a separate channel for driving the high-side power switch HSn of each inverter half bridge, a separate channel for driving the low-side power switch LSn of each inverter half bridge, and a separate channel for driving the protection switch Q7. In the case of a 3-phase motor 102, the inverter 104 has three phases, the single driver semiconductor die 206 has seven output channels (7ch'), six of the seven output channels are electrically coupled to the gate terminals of the power switches HSn, LSn of the three inverter phases, and a seventh one of the seven output channels is electrically coupled to the gate terminal of the protection switch Q7.

The power switch dies 203 are illustrated as vertical devices in FIG. 2, each with a gate (G) terminal and emitter (S) terminal at the top side of the die 203 and a collector terminal at the opposite side. Electrical connections between the power switches HSn, LSn, Q7, diodes D1-D7, the single driver semiconductor die 206 and the corresponding terminals 202 of the package 200 may be implemented by bond wires and/or metal clips 208, metallization 210 on the substrate(s) 204, etc. In general, the motor 102 driven by the power module 103 has m phases where m≥1.

Figure 3:
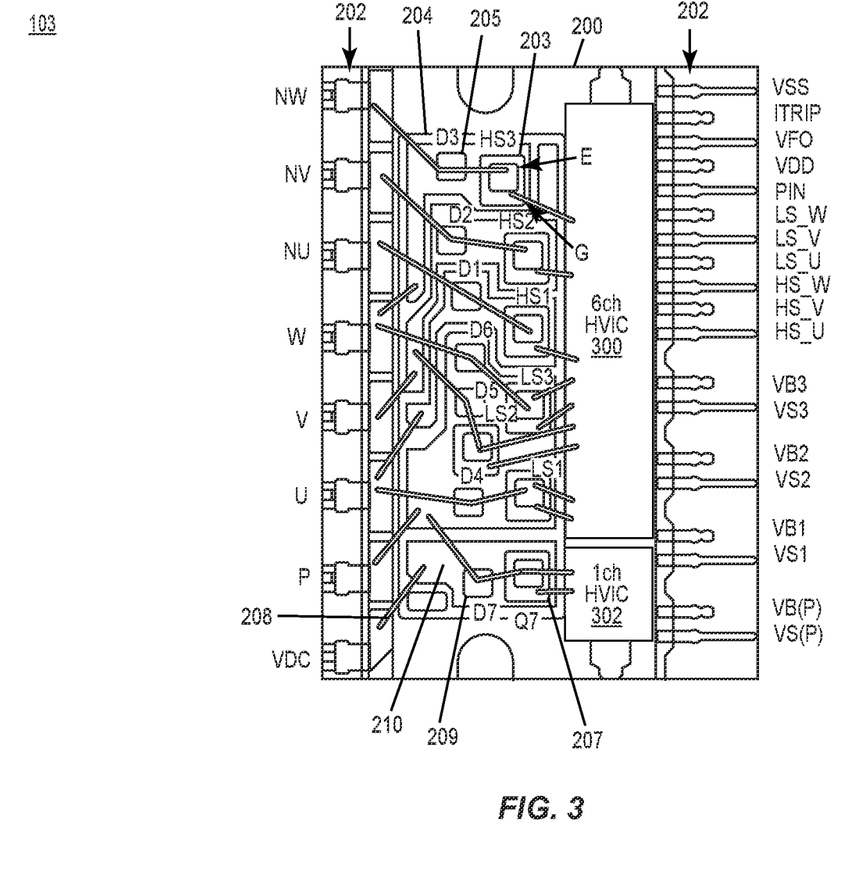
FIG. 3 illustrates a plan view of an embodiment of the power module in a package, according to another embodiment.

FIG. 3 illustrates another embodiment of the power module package 200. The embodiment illustrated in FIG. 3 is similar to the embodiment illustrated in FIG. 2. Different, however, the first driver circuit 106 and the second driver circuit 110 are included in separate semiconductor dies 300, 302. For the 3-phase motor example, the semiconductor die 300 that includes the first driver circuit 106 has six output channels ('6ch'); one dedicated channel for each power switch HSn, LSn of the inverter 104. The semiconductor die 302 that includes the second driver circuit 110 has a single output channel ('1ch') for the protection switch Q7.

Figure 4:
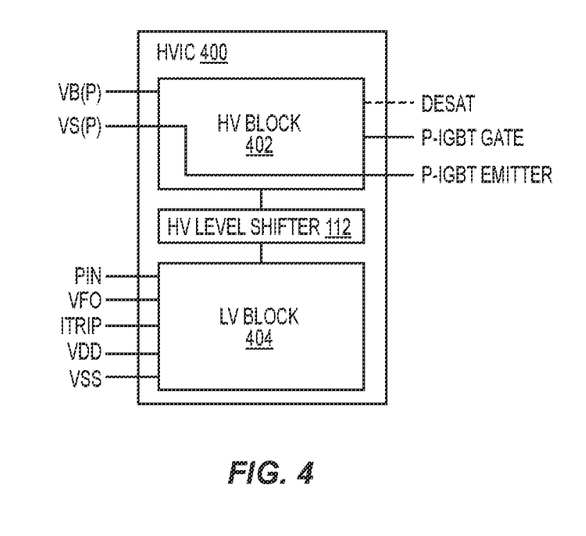
FIG. 4 illustrates a block diagram of an embodiment of a driver circuit for the protection switch of the power module.

FIG. 4 illustrates an embodiment of the driver circuit 110 for the protection switch Q7. As explained above, the driver circuit 110 is a HVIC 400 since the emitter potential of the protection switch Q7 is floating. The driver circuit 110 includes a high-voltage ('HV') block 402 for generating the gate-to-emitter voltage ('P-IGBT gate', 'P-IGBT emitter') from the power VB(P), VS(P) input to the driver circuit 110, for driving the protection switch Q7. The HV block 402 may sense the voltage 'DESAT' between the collector and emitter of the protection switch Q7. The driver circuit 110 may detect a short circuit condition based on the sensed voltage DESAT and shut off the short circuit current in response by turning off the protection switch Q7.

The driver circuit 110 also includes a low-voltage (IV') block 404 for generating the fault signal outputs VFO, ITRIP reported to the controller 114 and for receiving the logic control signal PIN from the controller 114 for controlling the switching state of the protection switch Q7 during normal operation. The LV block 404 of the HVIC 400 may be powered by the same supply inputs VDD, VSS as the inverter HVIC, e.g., as shown in FIG. 2. In this case, the low-side control supply terminals VDD, VSS are electrically coupled to both the first driver circuit 106 and the second driver circuit 110. The fault signals VFO, ITRIP may also be shared with the HVIC for inverter 104. As shown in FIG. 2, the HVIC 400 for the protection switch Q7 may be embedded on the same die as the HVIC for the inverter 104.

Figure 5:
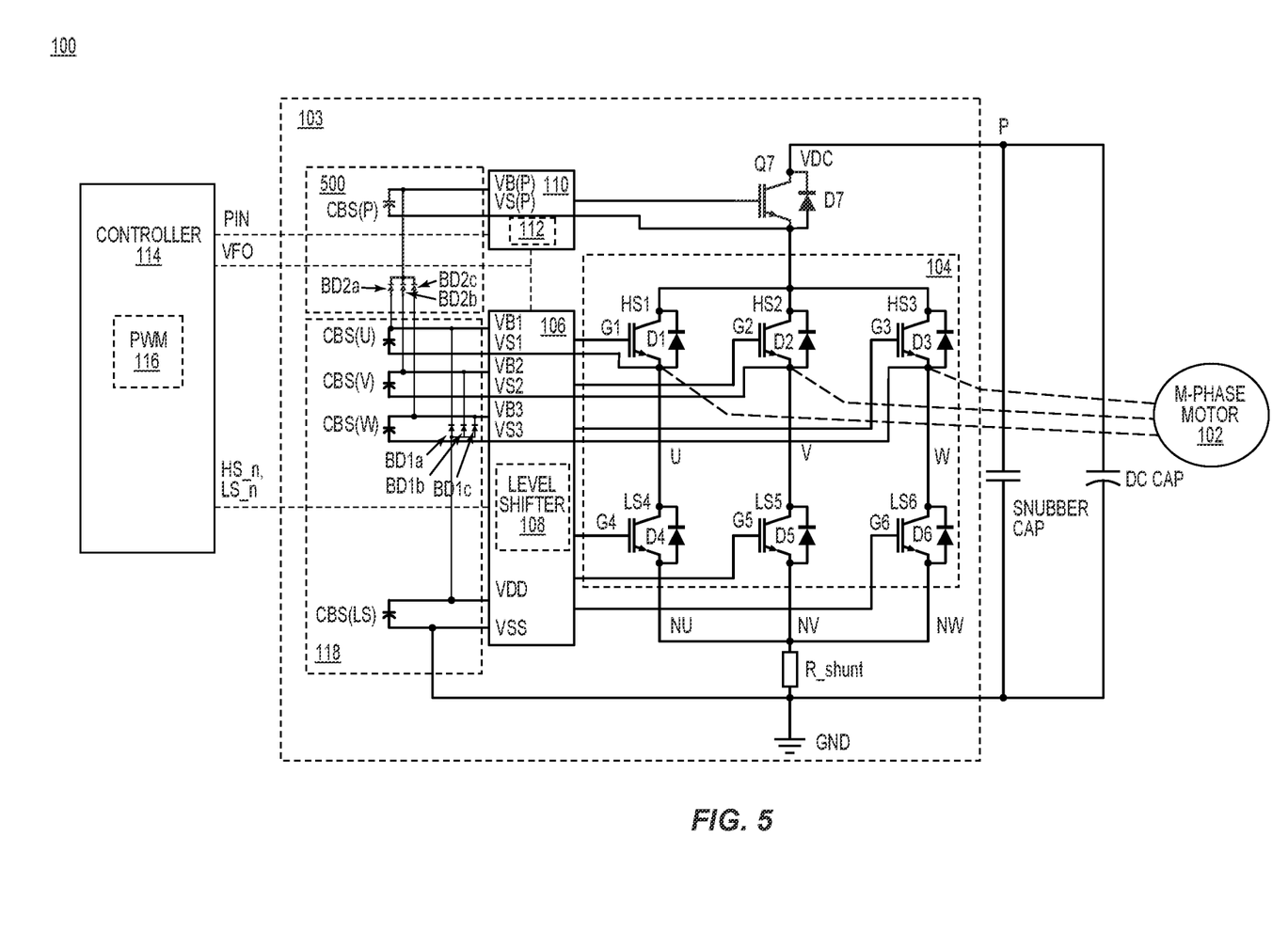
FIG. 5 illustrates a schematic view of the electronic system, according to another embodiment.

FIG. 5 illustrates an embodiment of a (second) bootstrap circuit 500 for charging the capacitor CBS(P) coupled to the driver circuit 110 for the protection switch Q7. The second bootstrap circuit 500 is electrically coupled to the first bootstrap circuit 118 and provides a floating supply VB(P), VS(P) to the second driver circuit 110 for fully driving the protection switch Q7. The first bootstrap circuit 118 provides a floating supply VBn, VSn to the first driver circuit 106 for fully driving each high-side power switch HSn of the inverter 104.

In one embodiment, the first bootstrap circuit 118 includes a first bootstrap capacitor CBS(n) electrically coupled across the high-side floating supply voltage pins VBn, VSn of the first driver circuit 106, for each high-side power switch HSn of the inverter 104. A first bootstrap diode BD1n charges the corresponding first bootstrap capacitor CBS(n) from a low-side control supply VDD, VSS of the first driver circuit 106, for each high-side power switch HSn of the inverter 104. The second bootstrap circuit 500 includes a second bootstrap capacitor CBS(P) electrically coupled across the floating supply voltage pins VB(P), VS(P) of the second driver circuit 106 and a second bootstrap diode BD2n for charging the second bootstrap capacitor CBS(P) from the corresponding first bootstrap capacitor CBS(n) of the first bootstrap circuit 118, for each high-side power switch HSn of the inverter 104.

Figure 6:
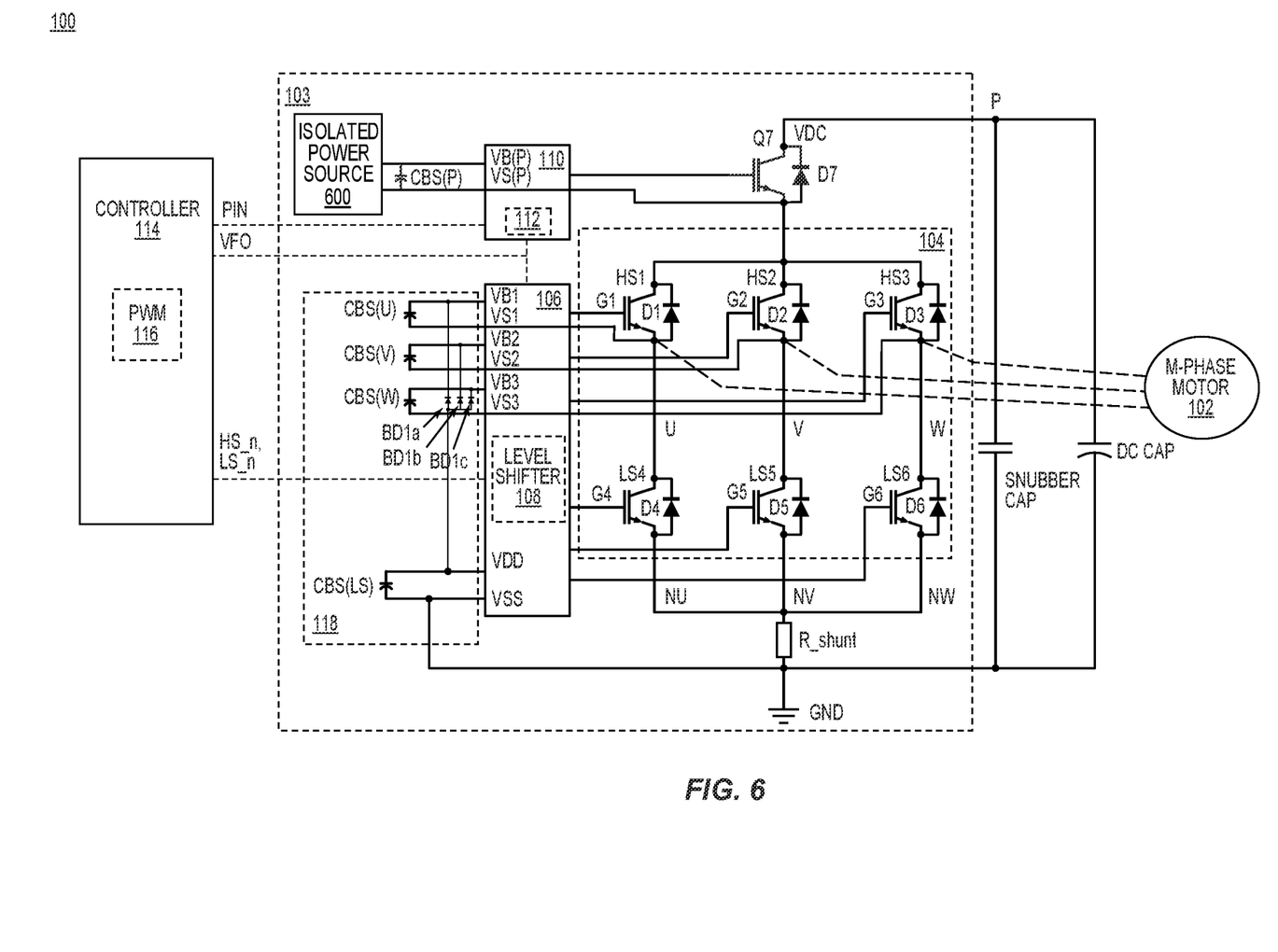
FIG. 6 illustrates a schematic view of the electronic system, according to another embodiment.

FIG. 6 illustrates another embodiment of the power module 103. According to this embodiment, an isolated power source 600 electrically coupled to the first bootstrap circuit 118 provides the floating supply VB(P), VS(P) to the second driver circuit 110 for fully driving the protection switch Q7.

Figure 7:
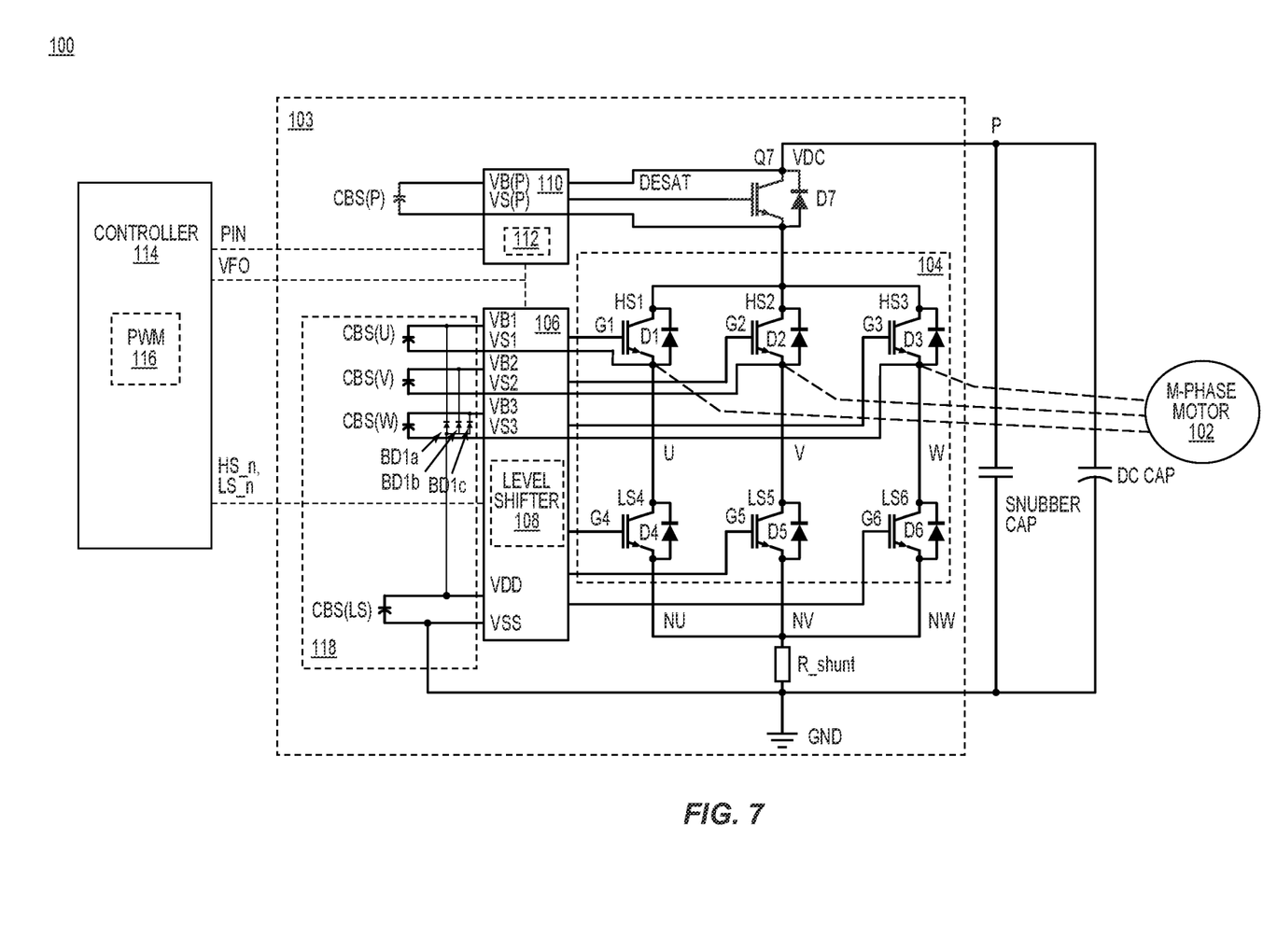
FIG. 7 illustrates a schematic view of the electronic system, according to another embodiment.
Figure 8:
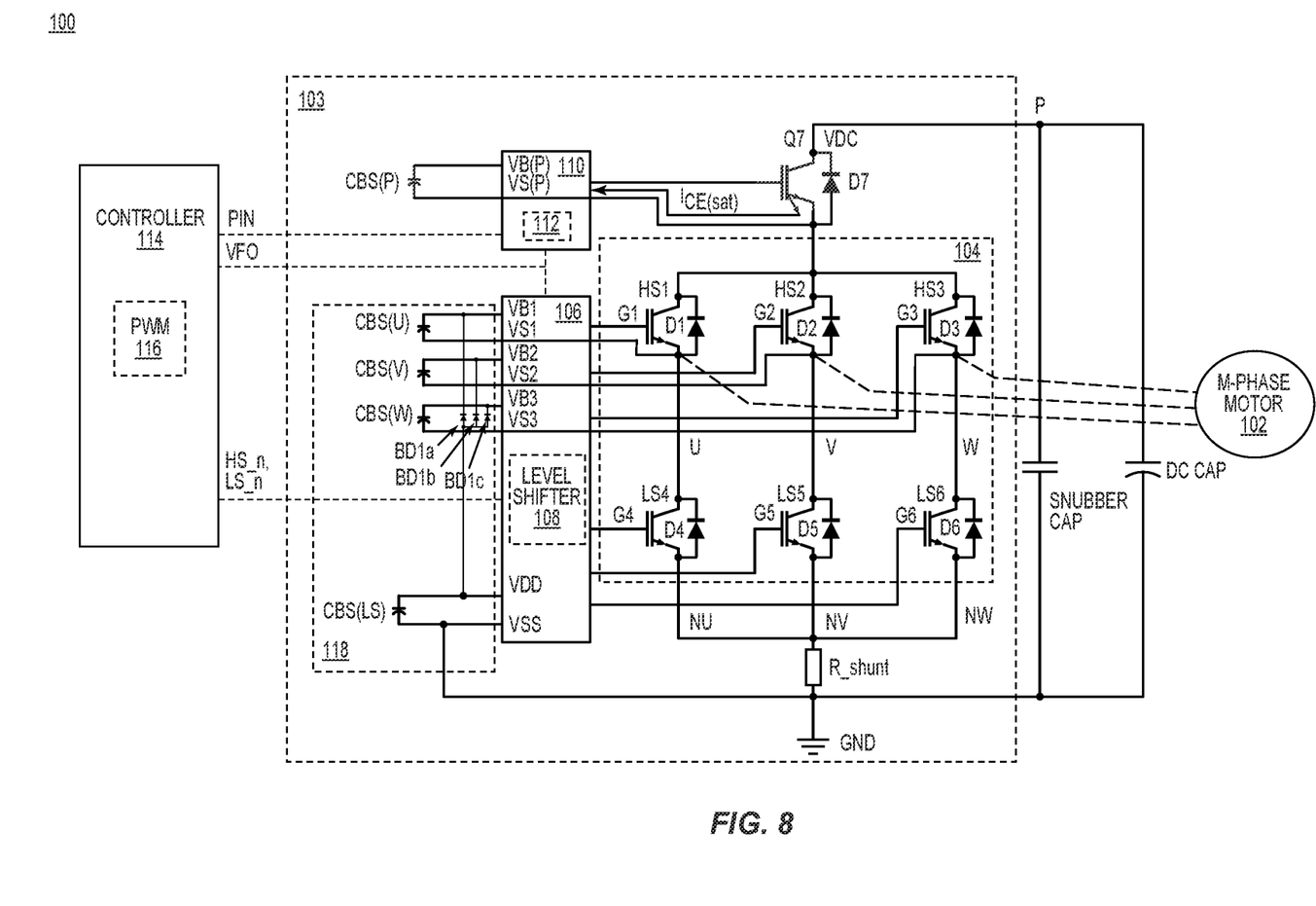
FIG. 8 illustrates a schematic view of the electronic system, according to another embodiment.
Figure 9:
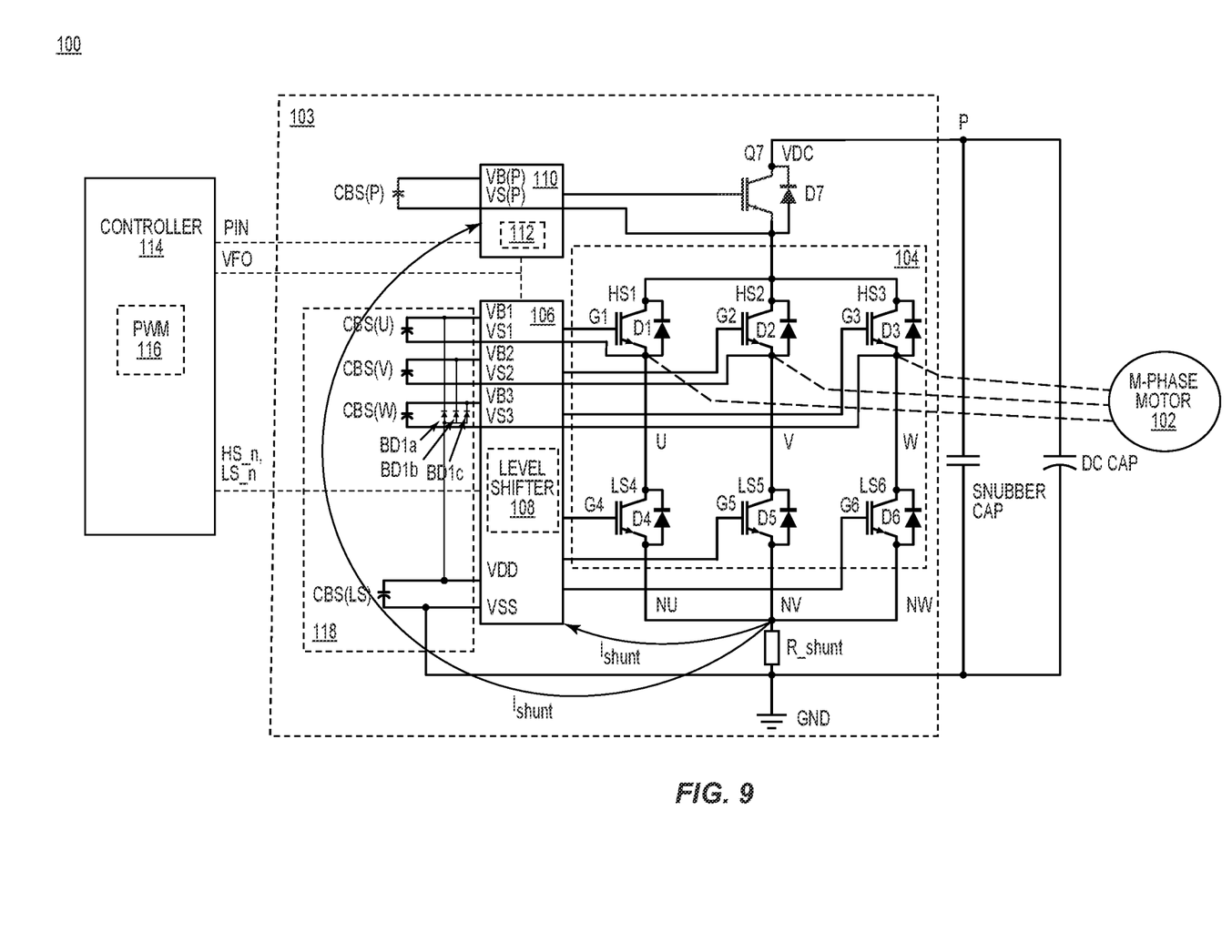
FIG. 9 illustrates a schematic view of the electronic system, according to another embodiment.

As previously described herein, the second driver circuit 110 may be configured to detect a short circuit condition and turn off the protection switch Q7 in response to detecting the short circuit condition. FIGS. 7 through 9 illustrates different embodiments of short circuit detection techniques that may be implemented by the second driver circuit 110.

In FIG. 7, the second driver circuit 110 monitors the voltage DESAT across the protection switch Q7. The second driver circuit 110 monitors for short circuit conditions by comparing DESAT to a threshold level and turns off the protection switch Q7 if the monitored voltage exceeds the threshold level.

In FIG. 8, the second driver circuit 110 monitors the current $I_{CE(sat)}$ flowing through the protection switch Q7. The second driver circuit 110 monitors for short circuit conditions by comparing $I_{CE(sat)}$ to a threshold level and turns off the protection switch Q7 if the monitored current exceeds the threshold level.

In FIG. 9, the second driver circuit 110 monitors a current $I_{shunt}$ flowing through the shunt resistor R_shunt or a voltage $V_{shunt}$ across the shunt resistor R_shunt. The second driver circuit 110 monitors for short circuit conditions by comparing $I_{shunt}$ or $V_{shunt}$ to a corresponding threshold level and turns off the protection switch Q7 if the monitored voltage $V_{shunt}$ or current $I_{shunt}$ exceeds the threshold level. The LV block 404 of the HVIC 400 for the second driver circuit 110 should have the same voltage potential as the inverter driver circuit 106, which can lead directly to the shunt resistor voltage $V_{shunt}$.

The shunt resistor R_shunt may be electrically coupled in series between each low-side power switch LSn of the inverter 104 and ground, e.g., as shown in FIGS. 1 and 5 through 9. Alternatively, the shunt resistor R_shunt may be electrically coupled in series between the positive bus input voltage terminal P and each high-side power switch HSn of the inverter 104. In this case, the shunt resistor R_shunt may be inserted between the positive bus input voltage terminal P and voltage node VDC or between the emitter of protection switch Q7 and the collectors of the high-side inverter power switches HSn.

Although the present disclosure is not so limited, the following numbered examples demonstrate one or more aspects of the disclosure.

Example 1. A power module for driving a motor, the power module comprising: a positive bus input voltage terminal; a phase terminal for each phase of the motor; an inverter comprising a half bridge for each phase of the motor, each half bridge comprising a high-side power switch electrically coupled between the positive bus input voltage terminal and the respective phase terminal and a low-side power switch electrically coupled between the respective phase terminal and ground; a first driver circuit configured to drive a gate terminal of each power switch of the inverter, the first driver circuit including level shift circuitry configured to provide a turn-on gate-to-emitter voltage to each high-side power switch of the inverter; a protection switch electrically coupled in series between the positive bus input voltage terminal and each high-side power switch of the inverter, the protection switch having a greater short-circuit withstand time (SCWT) and a lower short-circuit current level compared to each power switch of the inverter; and a second driver circuit configured to turn on the protection switch during normal operation of the power module and to turn off the protection switch in response to a detected short circuit condition, the second driver circuit including level shift circuitry configured to provide a turn-on gate-to-emitter voltage to the protection switch.

Example 2. The power module of example 1, wherein the second driver circuit and the first driver circuit are integrated in a same semiconductor die.

Example 3. The power module of example 2, wherein the motor is a 3-phase motor, wherein the inverter has three phases, wherein the semiconductor die has seven output channels, wherein six of the seven output channels are electrically coupled to the gate terminals of the power switches of the three inverter phases, and wherein a seventh one of the seven output channels is electrically coupled to a gate terminal of the protection switch.

Example 4. The power module of example 1, wherein the first driver circuit is implemented in a first semiconductor die and the second driver circuit is implemented in a second semiconductor die separate from the first semiconductor die.

Example 5. The power module of example 4, wherein the motor is a 3-phase motor, wherein the inverter has three phases, wherein the first semiconductor die has six output channels electrically coupled to the gate terminals of the power switches of the three inverter phases, and wherein the second semiconductor die has a single channel electrically coupled to a gate terminal of the protection switch.

Example 6. The power module of any of examples 1 through 5, further comprising: low-side control supply terminals electrically coupled to both the first driver circuit and the second driver circuit.

Example 7. The power module of any of examples 1 through 6, further comprising: a controller configured to control both the first driver circuit and the second driver circuit.

Example 8. The power module of example 7, wherein the first driver circuit and the second driver circuit share a fault signal output provided to the controller for indicating whether a fault has occurred.

Example 9. The power module of any of examples 1 through 8, further comprising: a first bootstrap circuit configured to provide a floating supply to the first driver circuit for fully driving each high-side power switch of the inverter; and a second bootstrap circuit electrically coupled to the first bootstrap circuit and configured to provide a floating supply to the second driver circuit for fully driving the protection switch.

Example 10. The power module of example 9, wherein the first bootstrap circuit comprises: a first bootstrap capacitor electrically coupled across high-side floating supply voltage pins of the first driver circuit, for each high-side power switch of the inverter; and a first bootstrap diode configured to charge the first bootstrap capacitor from a low-side control supply of the first driver circuit, for each high-side power switch of the inverter, wherein the second bootstrap circuit comprises: a second bootstrap capacitor electrically coupled across floating supply voltage pins of the second driver circuit; and a second bootstrap diode configured to charge the second bootstrap capacitor from the first bootstrap capacitor of the first bootstrap, for each high-side power switch of the inverter.

Example 11. The power module of any of examples 1 through 8, further comprising: a first bootstrap circuit configured to provide a floating supply to the first driver circuit for fully driving each high-side power switch of the inverter; and an isolated power source electrically coupled to the first bootstrap circuit and configured to provide a floating supply to the second driver circuit for fully driving the protection switch.

Example 12. The power module of any of examples 1 through 11, wherein the protection switch has a same breakdown voltage rating as each power switch of the inverter.

Example 13. The power module of any of examples 1 through 12, wherein the protection switch has a lower saturation current and a lower collector-emitter saturation voltage than each power switch of the inverter.

Example 14. The power module of any of examples 1 through 13, wherein the second driver circuit is configured to detect a short circuit condition and turn off the protection switch in response to detecting the short circuit condition.

Example 15. The power module of any of examples 1 through 14, wherein the second driver circuit is configured to monitor a voltage across the protection switch and turn off the protection switch if the monitored voltage exceeds a threshold level.

Example 16. The power module of any of examples 1 through 15, wherein the second driver circuit is configured to monitor a current flowing through the protection switch and turn off the protection switch if the monitored current exceeds a threshold level.

Example 17. The power module of any of examples 1 through 16, further comprising: a shunt resistor electrically coupled in series between each low-side power switch of the inverter and ground, or electrically coupled in series between the positive bus input voltage terminal and each high-side power switch of the inverter, wherein the second driver circuit is configured to monitor a current flowing through the shunt resistor or a voltage across the shunt resistor and turn off the protection switch if the monitored voltage or current exceeds a threshold level.

Example 18. A power electronic system, comprising: a multi-phase motor; and a power module configured to drive the multi-phase motor, wherein the power module comprises: a positive bus input voltage terminal; a phase terminal electrically coupled to each phase of the multi-phase motor; an inverter comprising a half bridge for each phase of the multi-phase motor, each half bridge comprising a high-side power switch electrically coupled between the positive bus input voltage terminal and the respective phase terminal and a low-side power switch electrically coupled between the respective phase terminal and ground; a first driver circuit configured to drive a gate terminal of each power switch of the inverter, the first driver circuit including level shift circuitry configured to provide a turn-on gate-to-emitter voltage to each high-side power switch of the inverter; a protection switch electrically coupled in series between the positive bus input voltage terminal and each high-side power switch of the inverter, the protection switch having a greater short-circuit withstand time (SCWT) and a lower short-circuit current level compared to each power switch of the inverter; and a second driver circuit configured to turn on the protection switch during normal operation of the power module and to turn off the protection switch in response to a detected short circuit condition, the second driver circuit including level shift circuitry configured to provide a turn-on gate-to-emitter voltage to the protection switch.

Example 19. The power electronic system of example 18, wherein the power module further comprises: a first bootstrap circuit configured to provide a floating supply to the first driver circuit for fully driving each high-side power switch of the inverter; and a second bootstrap circuit electrically coupled to the first bootstrap circuit and configured to provide a floating supply to the second driver circuit for fully driving the protection switch.

Example 20. The power electronic system of example 19, wherein the first bootstrap circuit comprises: a first bootstrap capacitor electrically coupled across high-side floating supply voltage pins of the first driver circuit, for each high-side power switch of the inverter; and a first bootstrap diode configured to charge the first bootstrap capacitor from a low-side control supply of the first driver circuit, for each high-side power switch of the inverter, wherein the second bootstrap circuit comprises: a second bootstrap capacitor electrically coupled across floating supply voltage pins of the second driver circuit; and a second bootstrap diode configured to charge the second bootstrap capacitor from the first bootstrap capacitor of the first bootstrap, for each high-side power switch of the inverter.

Example 21. The power electronic system of any of examples 16 through 20, further comprising: a controller configured to control both the first driver circuit and the second driver circuit.

Example 22. The power electronic system of example 21, wherein the first driver circuit and the second driver circuit share a fault signal output provided to the controller for indicating whether a fault has occurred.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power module, comprising:
a positive bus input voltage terminal;
a phase terminal for each phase supported by the power module;
an inverter comprising a half bridge for each phase supported by the power module, each half bridge comprising a high-side power switch electrically coupled between the positive bus input voltage terminal and the respective phase terminal and a low-side power switch electrically coupled between the respective phase terminal and ground;
a first driver circuit configured to drive a gate terminal of each power switch of the inverter;
a protection switch electrically coupled in series between the positive bus input voltage terminal and each high-side power switch of the inverter, the protection switch having a greater short-circuit withstand time (SCWT) and a lower short-circuit current level compared to each power switch of the inverter; and
a second driver circuit configured to turn on the protection switch during normal operation of the power module and to turn off the protection switch in response to a detected short circuit condition.

2. The power module of claim 1, wherein the second driver circuit and the first driver circuit are integrated in a same semiconductor die.

3. The power module of claim 1, wherein the inverter has three phases, wherein the semiconductor die has seven output channels, wherein six of the seven output channels are electrically coupled to the gate terminals of the power switches of the three inverter phases, and wherein a seventh one of the seven output channels is electrically coupled to a gate terminal of the protection switch.

4. The power module of claim 1, wherein the first driver circuit is implemented in a first semiconductor die and the second driver circuit is implemented in a second semiconductor die separate from the first semiconductor die.

5. The power module of claim 4, wherein the inverter has three phases, wherein the first semiconductor die has six output channels electrically coupled to the gate terminals of the power switches of the three inverter phases, and wherein the second semiconductor die has a single channel electrically coupled to a gate terminal of the protection switch.

6. The power module of claim 1, further comprising:
low-side control supply terminals electrically coupled to both the first driver circuit and the second driver circuit.

7. The power module of claim 1, further comprising:
a first bootstrap circuit configured to provide a floating supply to the first driver circuit for fully driving each high-side power switch of the inverter; and
a second bootstrap circuit configured to provide a floating supply to the second driver circuit for fully driving the protection switch.

8. The power module of claim 7,
wherein the first bootstrap circuit comprises:
a first bootstrap capacitor electrically coupled across high-side floating supply voltage pins of the first driver circuit, for each high-side power switch of the inverter; and
a first bootstrap diode configured to charge the first bootstrap capacitor from a low-side control supply of the first driver circuit, for each high-side power switch of the inverter,
wherein the second bootstrap circuit comprises:
a second bootstrap capacitor electrically coupled across floating supply voltage pins of the second driver circuit; and
a second bootstrap diode configured to charge the second bootstrap capacitor from the first bootstrap capacitor of the first bootstrap, for each high-side power switch of the inverter.

9. The power module of claim 1, further comprising:
a first bootstrap circuit configured to provide a floating supply to the first driver circuit for fully driving each high-side power switch of the inverter; and
an isolated power source electrically coupled to the first bootstrap circuit and configured to provide a floating supply to the second driver circuit for fully driving the protection switch.

10. The power module of claim 1, wherein the protection switch has a same breakdown voltage rating as each power switch of the inverter.

11. The power module of claim 1, wherein the protection switch has a lower saturation current and a lower collector-emitter saturation voltage than each power switch of the inverter.

12. The power module of claim 1, wherein the second driver circuit is configured to detect a short circuit condition and turn off the protection switch in response to detecting the short circuit condition.

13. The power module of claim 1, wherein the second driver circuit is configured to monitor a voltage across the protection switch and turn off the protection switch if the monitored voltage exceeds a threshold level.

14. The power module of claim 1, wherein the second driver circuit is configured to monitor a current flowing through the protection switch and turn off the protection switch if the monitored current exceeds a threshold level.

15. The power module of claim 1, further comprising:
a shunt resistor electrically coupled in series between each low-side power switch of the inverter and ground, or electrically coupled in series between the positive bus input voltage terminal and each high-side power switch of the inverter,
wherein the second driver circuit is configured to monitor a current flowing through the shunt resistor or a voltage across the shunt resistor and turn off the protection switch if the monitored voltage or current exceeds a threshold level.

16. A power electronic system, comprising:
a multi-phase motor; and
a power module configured to drive the multi-phase motor,
wherein the power module comprises:
a positive bus input voltage terminal;
a phase terminal electrically coupled to each phase of the multi-phase motor;
an inverter comprising a half bridge for each phase of the multi-phase motor, each half bridge comprising a high-side power switch electrically coupled between the positive bus input voltage terminal and the respective phase terminal and a low-side power switch electrically coupled between the respective phase terminal and ground;
a first driver circuit configured to drive a gate terminal of each power switch of the inverter;
a protection switch electrically coupled in series between the positive bus input voltage terminal and each high-side power switch of the inverter, the protection switch having a greater short-circuit withstand time (SCWT) and a lower short-circuit current level compared to each power switch of the inverter; and
a second driver circuit configured to turn on the protection switch during normal operation of the power module and to turn off the protection switch in response to a detected short circuit condition.

17. The power electronic system of claim 16, wherein the power module further comprises:
a first bootstrap circuit configured to provide a floating supply to the first driver circuit for fully driving each high-side power switch of the inverter; and
a second bootstrap circuit electrically coupled to the first bootstrap circuit and configured to provide a floating supply to the second driver circuit for fully driving the protection switch.

18. The power electronic system of claim 17,
wherein the first bootstrap circuit comprises:
a first bootstrap capacitor electrically coupled across high-side floating supply voltage pins of the first driver circuit, for each high-side power switch of the inverter; and
a first bootstrap diode configured to charge the first bootstrap capacitor from a low-side control supply of the first driver circuit, for each high-side power switch of the inverter,
wherein the second bootstrap circuit comprises:
a second bootstrap capacitor electrically coupled across floating supply voltage pins of the second driver circuit; and
a second bootstrap diode configured to charge the second bootstrap capacitor from the first bootstrap capacitor of the first bootstrap, for each high-side power switch of the inverter.

19. The power electronic system of claim 16, further comprising:
a controller configured to control both the first driver circuit and the second driver circuit,
wherein the first driver circuit and the second driver circuit share a fault signal output provided to the controller for indicating whether a fault has occurred.

20. A power module, comprising:
a half bridge;

a protection switch electrically coupled in series with the half bridge, the protection switch having a greater short-circuit withstand time (SCWT) and a lower short-circuit current level compared to the half bridge; and a circuit configured to turn on the protection switch during normal operation of the power module and to turn off the protection switch in response to a detected short circuit condition.

\* \* \* \* \*